United States Patent

Morikiyo et al.

[11] Patent Number: 5,819,908
[45] Date of Patent: Oct. 13, 1998

[54] SWINGING HOOK APPARATUS OF A STORAGE CONVEYOR

[75] Inventors: Akira Morikiyo, Tokorozawa; Yoshifumi Sueishi, Hanno; Yusuke Omura; Kenji Umezawa, both of Tokorozawa, all of Japan

[73] Assignee: Tsubakimoto Chain Co., Osaka-fu, Japan

[21] Appl. No.: 855,654

[22] Filed: May 13, 1997

Related U.S. Application Data

[63] Continuation of Ser. No. 420,685, Apr. 12, 1995, abandoned.

[30] Foreign Application Priority Data

Apr. 14, 1994 [JP] Japan ............................ 6-099130

[51] Int. Cl.⁶ .................. B65G 19/26; B61J 3/04
[52] U.S. Cl. ........................ 198/732; 104/172.4
[58] Field of Search ............ 198/732; 104/172.2, 104/172.3, 172.5

[56] References Cited

U.S. PATENT DOCUMENTS

| | | | |
|---|---|---|---|
| 3,587,830 | 6/1971 | Calistrat | 198/732 |
| 3,677,686 | 7/1972 | Powel | 198/732 X |
| 3,812,955 | 5/1974 | Kopp | 198/732 |
| 3,877,386 | 4/1975 | Wakabayashi | 104/172 |
| 4,004,680 | 1/1977 | Warmann | 104/172.3 X |
| 4,417,653 | 11/1983 | Zwezerynen | 198/732 X |
| 4,771,700 | 9/1988 | Wakabayashi | 104/172.3 |
| 4,967,541 | 11/1990 | Lakey | 198/732 X |
| 5,052,546 | 10/1991 | Langen et al. | 198/732 X |

FOREIGN PATENT DOCUMENTS

| | | | |
|---|---|---|---|
| 868751 | 2/1953 | Germany | 104/172.3 |
| 958029 | 2/1957 | Germany | 104/172.3 |
| 1184371 | 12/1964 | Germany | 104/172.3 |
| 57-59166 | 12/1982 | Japan . | |
| 62-125946 | 6/1987 | Japan . | |

*Primary Examiner*—Janice L. Krizek
*Assistant Examiner*—Thuy V. Tran
*Attorney, Agent, or Firm*—Armstrong, Westerman, Hattori, McLeland & Naughton

[57] ABSTRACT

A swinging hook apparatus, rotatably mounted on a pivotal shaft on a conveyor chain, comprising a swinging hook having an abutting surface for detachably engaging with conveyor goods and formed above the pivotal shaft of the swinging hook and having an external force action surface formed below the pivotal shaft with a bearing of the pivotal shaft mounted, through a shock absorber, on the swinging hook support in a longitudinal direction of the conveyor chain.

4 Claims, 3 Drawing Sheets

SWINGING HOOK APPARATUS OF A STORAGE CONVEYOR

This application is a continuation of application Ser. No. 08/420,685 filed Apr. 12, 1995, now abandoned.

BACKGROUND OF THE INVENTION

The present invention relates to a storage conveyor for conveying and storing goods, which is detachably hooked on a hook means, such as a hook, a pusher, or a dog (hereinafter referred to as a "hook"), wherein the hook is mounted, at certain intervals, on a driving conveyor chain and normally urged to a stand position.

Conventional push or traction hook apparatus (hereinafter referred to as a "swinging hook apparatus") of a storage conveyor, as disclosed in Japanese Patent Publication No. Sho 57-59166, includes a hook rod, normally urged to a stand portion, wherein a hook portion, detachably hooked on goods, and an external force action surface, are formed above a pivotal shaft.

That is, as shown in FIG. 5, according to the foregoing conventional hook apparatus, the hook rod D is pivotally mounted, about a pivotal shaft P, on an attachment A which is mounted, at certain intervals, on a conveyor chain C, driven in the direction of the arrow, FIG. 5. The hook rod D comprises a hook portion F for pulling conveyor goods, such as a conveyor truck, by being hooked thereon, at an upper portion thereof, a weight W, at a lower portion thereof, for urging the hook rod D to a projecting position so that the hook rod D can be hooked on the conveyor goods and an external force action surface T, formed between the hook portion F and the pivotal shaft P, for releasing the hook portion F from the conveyor goods against the biased force by the weight W, by abutting external force, such as a leading truck or a stop rod, and the like (not shown), projecting into the running track at a fixed position.

Constructed, as described above, as the conveyor chain C moves in an arrow direction, as viewed in FIG. 5, the hook apparatus pulls, or draws, conveyor goods to which the hook portion F is engaged, in the same direction, when the hook rod D is urged to a standing position by the weight W. While when the external force action surface T comes into contact with the collision prevention rod (not shown), mounted projectively on a rear end portion of the leading truck, or a stop rod fixed at the fixed position, the hook rod D rotates, in a clockwise direction, with respect to the pivotal shaft P, as viewed in FIG. 5, so that the hook portion F is disengaged from the conveyor goods and, thereafter, the conveyor goods stop by loss of driving force.

According to such a hook apparatus, wherein the hook portion F and the external force action surface T are both formed at the upper portion of the hook apparatus and above the pivotal shaft P, the length of the upper portion of the hook rod D and the turning radius are elongated with respect to the pivotal shaft P of the hook portion F. Therefore, a large amount of space, in a vertical direction between the track of the conveyor chain C and the conveyor goods, such as a truck to be pulled or drawn, is necessary for the hook portion F to engage such conveyor goods. This raised the problem that the occupied space of the storage conveyor is increased.

Further, such a conventional hook apparatus has problems in not only that the conveyor goods start abruptly when the hook portion F is engaged with the conveyor goods, causing the engagement shock to be loaded directly on pivotal shaft P and not reduced, making stable conveyance difficult, causing sounds of the engagement shock and accidents, such as breakdown of the pivotal shaft.

SUMMARY OF THE INVENTION

In view of the foregoing disadvantages, inherent in the known type of hook apparatus, the present invention provides a swinging hook apparatus comprising a pivotal shaft, a hook rod, rotatably mounted on the pivotal shaft, a hook portion formed above the pivotal shaft, and an external force action surface formed below the pivotal shaft and separately from the hook portion, wherein the pivotal shaft is shock-absorbingly mounted, through a shock absorber member, on an attachment 1 in a longitudinal direction of the conveyor chain.

More particularly, according to one preferred embodiment of the present invention, the swinging hook apparatus comprises a swinging hook member, wherein an abutting surface, for detachably engaging with conveyor goods, is formed above the pivotal shaft of the swinging hook member while an external force action surface is formed below the pivotal shaft.

According to another preferred embodiment of the swinging hook apparatus of the present invention, a bearing member of the pivotal shaft is mounted, through shock absorber means, on a swinging hook support member, in slidably connection therewith and in a longitudinal direction thereof.

According to still another preferred embodiment of the swinging hook apparatus of the present invention, dust-proof eaves are protrusively mounted on the bearing member of the pivotal shaft.

According to yet another preferred embodiment of the swinging hook apparatus of the present invention, the swinging hook member includes a recess groove in which the bearing member is fitted, wherein the bearing member is connected to the swinging hook member through the pivotal shaft.

Constructed according to the present invention and as described above, the swinging hook member, mounted on the ongoing conveyor chain and urged to a stand position, contacts the conveyor goods and, in engagement therewith, moves such goods along with the conveyor chain.

The shock of the collision, when the swinging hook member engages the conveyor goods, is absorbed by the shock absorber member supporting the bearing member of the pivotal member of the swinging hook member.

Then the external force acts on the external force action surface, formed below the pivotal shaft of the swinging hook member and urged to a projecting position, to urge the external force action surface rearwardly and the abutting surface frontward, then the engagement between the swinging hook member and the conveyor goods is released and the conveyor goods stops due to the disconnection of the swinging hook member and the stopped goods remain stopped at the stop position even as the conveyor chain continues to run.

BRIEF DESCRIPTION OF THE DRAWINGS

The instant invention will be more fully described and better understood from the following description, taken with the appended drawings, in which.

DETAILED DESCRIPTION OF THE PREFERRED EMBODIMENT

Figure 1:
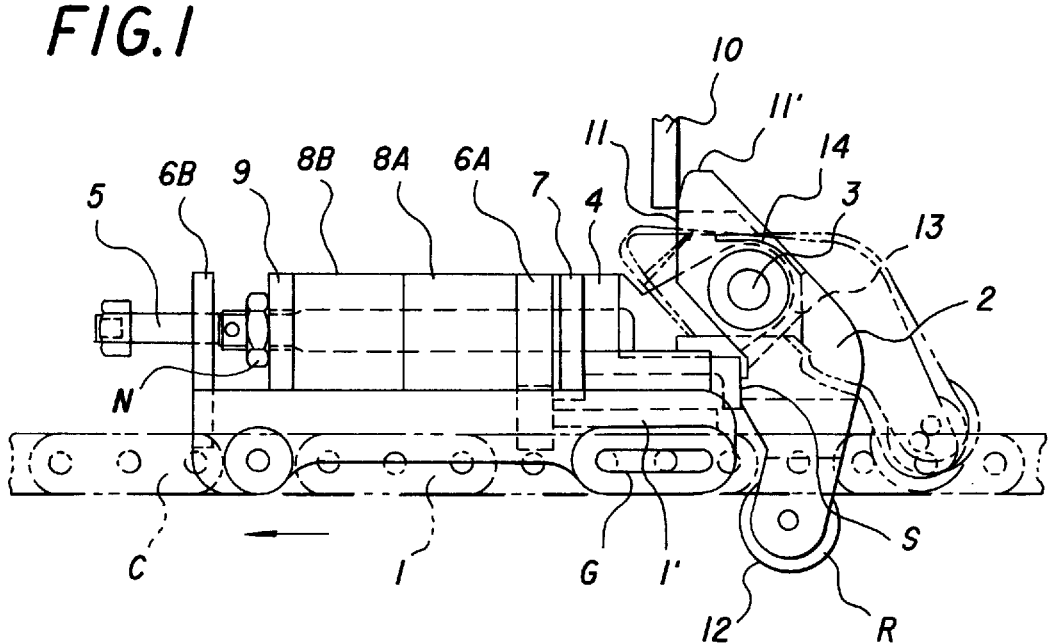
FIG. 1 shows a side view of one embodiment of the swinging hook member, mounted to a storage conveyor chain, according to the present invention.
Figure 2:
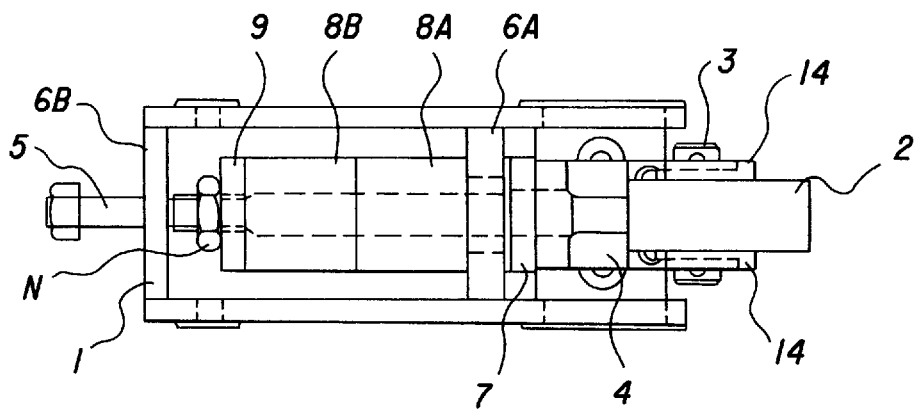
FIG. 2 shows a plan view of the swinging hook member shown in FIG. 1.
Figure 3:
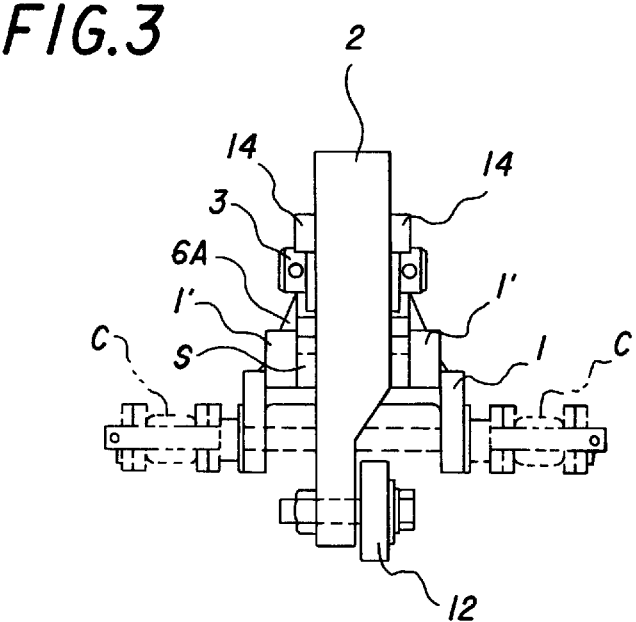
FIG. 3 shows a rear end view of the swinging hook member shown in FIG. 1.
Figure 4:
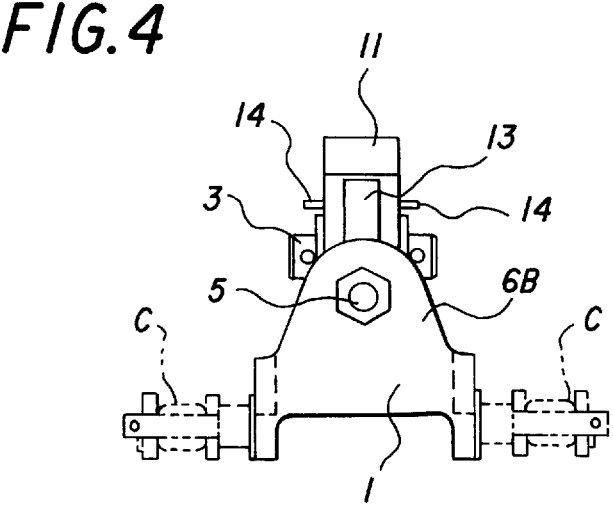
FIG. 4 shows a front view of the swinging hook member shown in FIG. 1.
Figure 5:
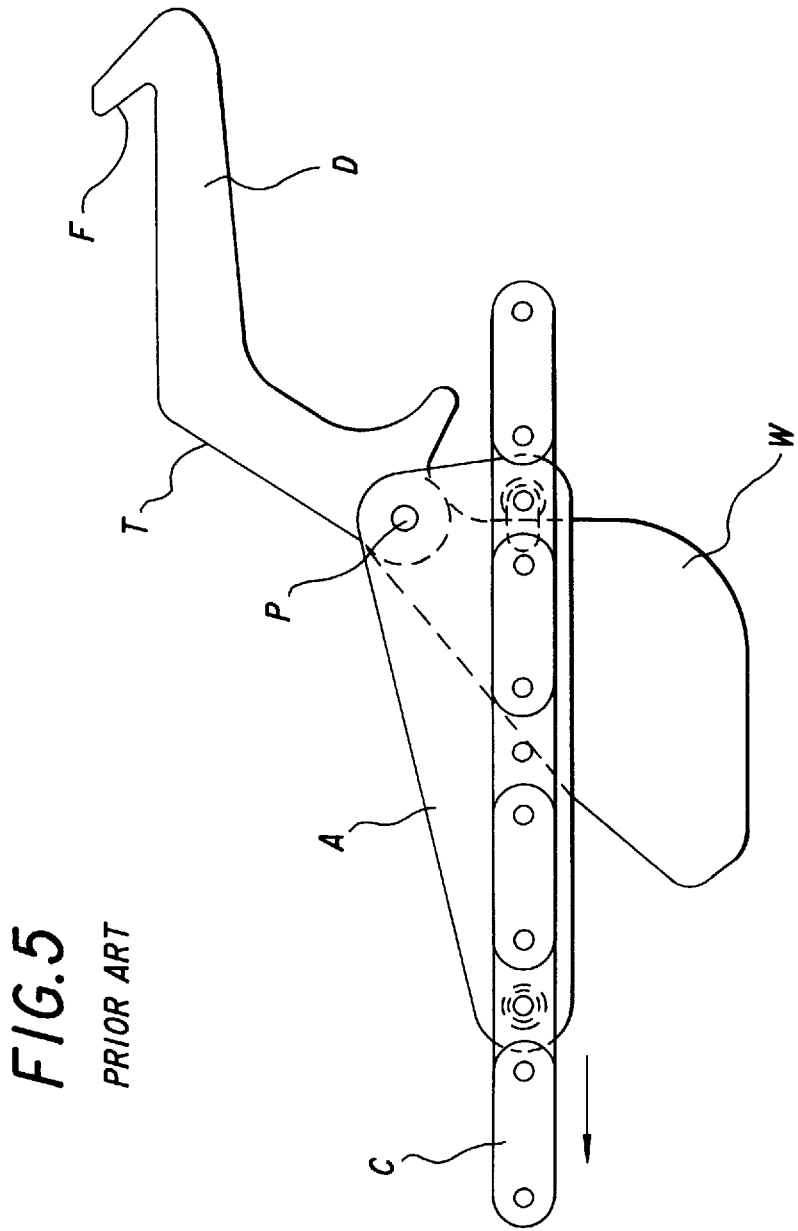
FIG. 5 shows a side view of the conventional swinging hook member.

A framed swinging hook support member 1, FIG. 1, is pivotally mounted on a storage conveyor chain with two lanes C, C, FIGS. 3 and 4, running parallel with each other in an arrow direction (as viewed in FIG. 1) and is slidably mounted thereon by inserting pins, projecting from chain link plate, into a slot G formed at a rear end portion of the swinging hook support member 1. A pair of front and rear support members 6A, 6B are mounted on the swinging hook support member 1, at a distance from each other and projecting upwardly. A shock absorber guide rod 5 is slidably supported by the front and rear support members 6A, 6B and is elongated frontward from a bearing member 4 which rotatably mounts a swinging hook member 2 about a pivotal shaft 3.

The bearing member 4 is slidably mounted in a longitudinal direction of the chain C, on a resinous plate 1' mounted on the swinging hook support member 1. A shock absorber plate 7, made of, for example, a silencer rubber and including a bore therewithin through which the shock absorber guide rod 5 is interposed, is mounted between the bearing member 4 and the rear support member 6A. Plural shock absorber members 8A, 8B, made of, for example, cushion rubber and including a bore therewithin through which the shock absorber guide rod 5 is interposed, are mounted between the front and rear support members 6A, 6B. By fastening a nut N, the shock absorber plate 7 is interposed and elastically pressed between the bearing member 4 and the rear support member 6A, while the plural shock absorber members 8A, 8B are interposed and elastically pressed between the rear support member 6A and a hold member 9.

The swinging hook member 2 comprises an abutting surface 11 for contacting with an engaging rod 10, vertically elongated downwardly from the conveyor goods, above the pivotal shaft 3. An external force action surface 12, formed on a circumferential periphery of a roller R which is rotatably mounted below the pivotal shaft 3.

The external force action surface 12, as shown in phantom lines, is tilted rearwardly, as shown in FIG. 1, by action of external force so that the abutting surface 11 comes off from the engaging rod 10.

Because the upper end 11' of the abutting surface 11 is tilted frontward, arcing about the pivotal shaft 3, and pushes the engaging rod 10 forwardly, a part of the upper end 11' is preferably cut out to prevent the stop position of the conveyor goods from greatly moving, by reducing the portion of the upper end 11' that would further push the engaging rod 10.

The bearing member 4 is fitted in a recess groove 13, formed at the swinging hook member 2, and connected therewith by the pivotal shaft 3.

Further, dust-proof eaves 14, 14 are mounted on the opposite sides of the swinging hook member 2 above and around the pivotal shaft 3.

Because the center of gravity of the swinging hook member 2 is positioned lower than the pivotal shaft 3, the swinging hook member 2 is normally urged to a standing position, FIG. 1. The bearing member 4 comprises a stopper S, FIG. 3, which holds the swinging hook member 2, with the abutting surface 11 thereof faced to the engaging rod 10 of the conveyor goods.

As will be understood from the foregoing description, according to the swinging hook apparatus of the present invention, because the hook portion, urged to standing position, is formed above a pivotal shaft, and an external force action surface formed, separately from the hook portion, below the pivotal shaft, the turning radius of the swinging hook member can be reduced, thereby enabling the swinging hook member to be arranged in proximity to the conveyor goods. Thus, the track of the storage conveyor chain can be close to that of the conveyor goods, and the vertical occupied space of the storage conveyor can be reduced (½ of the conventional one), thereby making the construction of the storage conveyor more compact.

Further, according to the swinging hook apparatus of the present invention, because the bearing member of the pivotal shaft is mounted, through shock absorber means, such as rubber or spring, on a swinging hook support member, in slidably connection therewith and in a longitudinal direction thereof, the shock of the collision, when the swinging hook member collides with the conveyor goods, can be absorbed by the shock absorber member, so that the sound of the engagement shock can be reduced and the reactive force toward the conveyor goods can be reduced, thereby preventing the conveyor goods from moving against the swinging hook member.

As the swinging hook member includes plural shock absorber members interposed therewithin, it is possible to adjust the shock absorbing force, by selectively combining the different shock absorber members with different elastic moduli.

Furthermore, because the dust-proof eaves are mounted on opposite sides of the swinging hook member, above and around the pivotal shaft, and alien substance, such as oil or dust, is prevented from entering the bearing member, so that the swinging hook member can continue to smoothly work. Still more, because the bearing member is fitted in a recess groove, formed at the swinging hook member, and connected therewith by the pivotal shaft, the width of the upper surface of the bearing member can be reduced and prevent the alien substance from accumulating thereon, thereby enabling the swinging hook member to continue to smoothly work without interference from such an alien substance.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A storage conveyor, comprising:
   a conveyor chain;
   swinging hook support members mounted to said conveyor chain above said conveyor chain;
   a swinging hook support shaft mounted to each of said swinging hook support members through a bearing member and shock absorbing means, said swinging hook support shaft and said bearing member being movable in a parallel longitudinal direction of said conveyor chain;
   a plurality of swinging hook members for detachably engaging with conveyor goods, each of said swinging hook members being rotatably mounted around said swinging hook support shaft of said conveyor chain and normally urged to a standing position, each of said swinging hook members includes;
- an abutting surface, for detachably engaging with conveyor goods, formed above said swinging hook support shaft of said swinging hook member, said abutting surface extending above said conveyor chain when said swinging hook member is urged to the standing position, and external force action surface, formed below the swinging hook support shaft, said external force action surface extending below said conveyor chain when said swinging hook member is urged to the standing position, whereby said external force action surface retracts above a lower surface of said conveyor chain and said abutting surface disengages with said conveyor goods when said swinging hook member is tilted.

2. A storage conveyor as recited in claim 1, each of wherein said swinging hook support members includes a stopper mounted thereon below said support shaft, said stopper holding said swinging hook members to said standing position.

3. A storage conveyor as recited in claim 1, wherein said bearing member includes dust-proof eaves, protrusively mounted thereon.

4. A storage conveyor as recited in claim 1, further comprises a recess groove formed on said swinging hook members, wherein said bearing member is fitted in said recess groove and in connection with said swinging hook members through said support shaft.

* * * * *